US012355911B2

(12) United States Patent
Inaba et al.

(10) Patent No.: US 12,355,911 B2
(45) Date of Patent: Jul. 8, 2025

(54) WORK SUPPORT SYSTEM, PORTABLE TERMINAL, WORK SUPPORT METHOD AND WORK SUPPORT PROGRAM

(71) Applicants: DAIKIN INDUSTRIES, LTD., Osaka (JP); Fairy Devices Inc., Tokyo (JP)

(72) Inventors: Yoshinao Inaba, Osaka (JP); Masato Fujino, Tokyo (JP)

(73) Assignees: DAIKIN INDUSTRIES, LTD., Osaka (JP); Fairy Devices Inc., Tokyo (JP)

(*) Notice: Subject to any disclaimer, the term of this patent is extended or adjusted under 35 U.S.C. 154(b) by 0 days.

(21) Appl. No.: 18/851,978

(22) PCT Filed: Mar. 9, 2023

(86) PCT No.: PCT/JP2023/009140
§ 371 (c)(1),
(2) Date: Sep. 27, 2024

(87) PCT Pub. No.: WO2023/189380
PCT Pub. Date: Oct. 5, 2023

(65) Prior Publication Data
US 2025/0112986 A1 Apr. 3, 2025

(30) Foreign Application Priority Data
Mar. 31, 2022 (JP) ................... 2022-061127

(51) Int. Cl.
*H04M 1/72454* (2021.01)
*G06Q 10/0631* (2023.01)
(52) U.S. Cl.
CPC ............. *H04M 1/72454* (2021.01);
*G06Q 10/063114* (2013.01)

(58) Field of Classification Search
CPC ............... H04M 1/72454; G06Q 10/063114
See application file for complete search history.

(56) References Cited

U.S. PATENT DOCUMENTS

| 2017/0068924 | A1 | 3/2017 | Tanaka et al. |
| 2019/0213892 | A1* | 7/2019 | Schwindt ............. G08G 5/0013 |

(Continued)

FOREIGN PATENT DOCUMENTS

| JP | 2003-058684 | 2/2003 |
| JP | 2006-277654 | 10/2006 |

(Continued)

OTHER PUBLICATIONS

International Search Report for PCT/JP2023/009140 mailed on May 9, 2023.

(Continued)

*Primary Examiner* — Justin Y Lee
(74) *Attorney, Agent, or Firm* — IPUSA, PLLC

(57) ABSTRACT

In a work support system for supporting a work of a worker carrying a portable terminal, a communication volume of the portable terminal is reduced. The work support system includes: a portable terminal; and a support server configured to communicate with the portable terminal and support a work of a worker carrying the portable terminal, wherein a control unit included in the portable terminal determines a work behavior of the worker based on condition information specified for each work content performed by the worker, and changes, in a case of having determined that the work behavior of the worker deviates from a range specified based on the condition information, types of data transmitted from the portable terminal to the support server.

14 Claims, 12 Drawing Sheets

(56) References Cited

U.S. PATENT DOCUMENTS

2019/0362243 A1    11/2019  Matsumura
2021/0004764 A1     1/2021  Matsumura
2022/0277256 A1*  9/2022  Mellon ................ G06Q 10/087
2023/0393561 A1*  12/2023  Hayashi ................. G05B 23/02

FOREIGN PATENT DOCUMENTS

| JP | 2008-084068 | 4/2008 |
| --- | --- | --- |
| JP | 2017-49916 | 3/2017 |
| JP | 2020-177471 | 10/2020 |
| JP | 2021-056922 | 4/2021 |
| JP | 2022-146779 | 10/2022 |

OTHER PUBLICATIONS

International Preliminary Report on Patentability for PCT/JP2023/009140 mailed on Oct. 10, 2024.
Extended European Search Report for 23779406.0 dated Apr. 4, 2025.

* cited by examiner

FIG.2
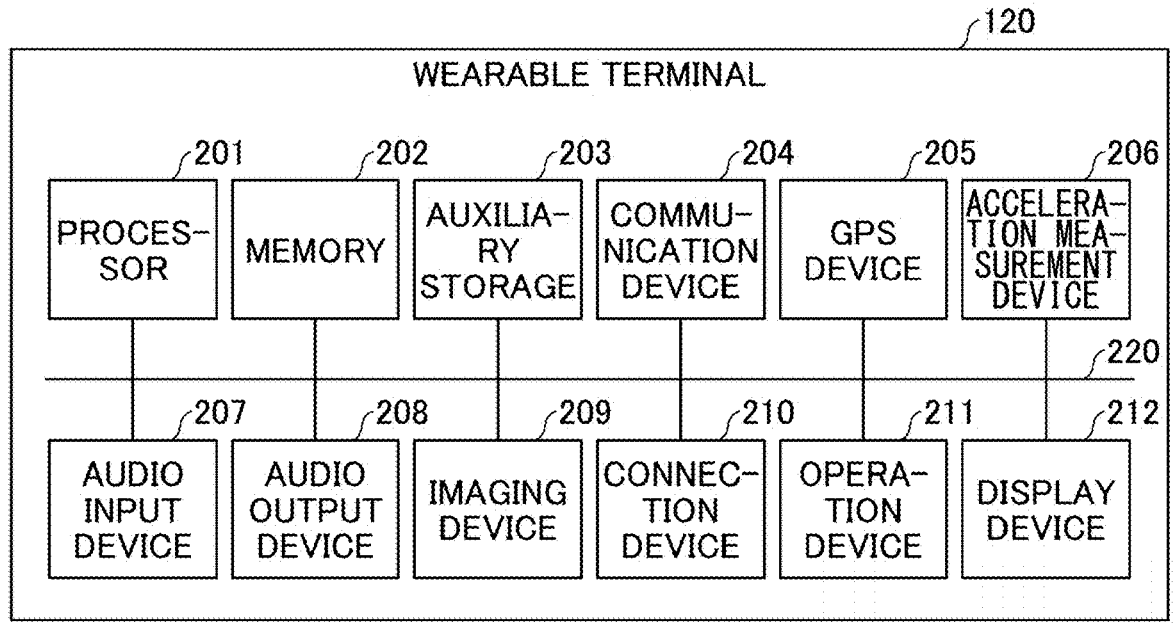
(a)
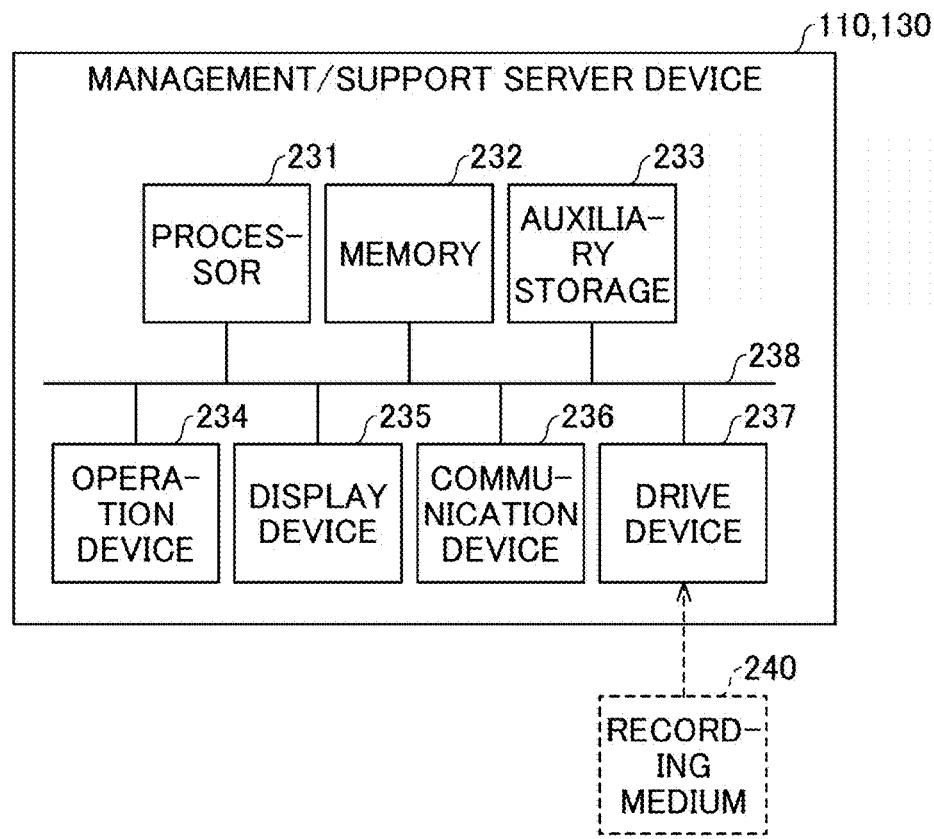
(b)

FIG.3

SCHEDULE INFORMATION (ON-SITE WORKER α) — 310

| START/END TIME | 9:00 | 10:00 | 11:00 | 12:00 | 13:00 | 14:00 | 15:00 | 16:00 | 17:00 |
|---|---|---|---|---|---|---|---|---|---|
| WORK CONTENT (WORK TIME) | WORK B (1.25 h) | | MOVE-MENT | WORK A (1 h) | | WORK A (1.25 h) | | MOVE-MENT | WORK C (1.25 h) | | MOVE-MENT | WORK B (0.75 h) |
| ALLOWABLE RANGE | ±15 MINUTES |

NORMAL RANGE INFORMATION — 320

| WORK CONTENT | POSITION INFORMATION | IMAGE INFORMATION | AUDIO INFORMATION | ACCELERATION INFORMATION | ATTACHED SENSOR INFORMATION |
|---|---|---|---|---|---|
| WORK A | NORMAL RANGE A1 | NORMAL RANGE A2 | NORMAL RANGE A3 | NORMAL RANGE A4 | NORMAL RANGE A5 |
| WORK B | NORMAL RANGE B1 | NORMAL RANGE B2 | NORMAL RANGE B3 | NORMAL RANGE B4 | NORMAL RANGE B5 |
| WORK C | NORMAL RANGE C1 | NORMAL RANGE C2 | NORMAL RANGE C3 | NORMAL RANGE C4 | NORMAL RANGE C5 |

300 CONDITION INFORMATION

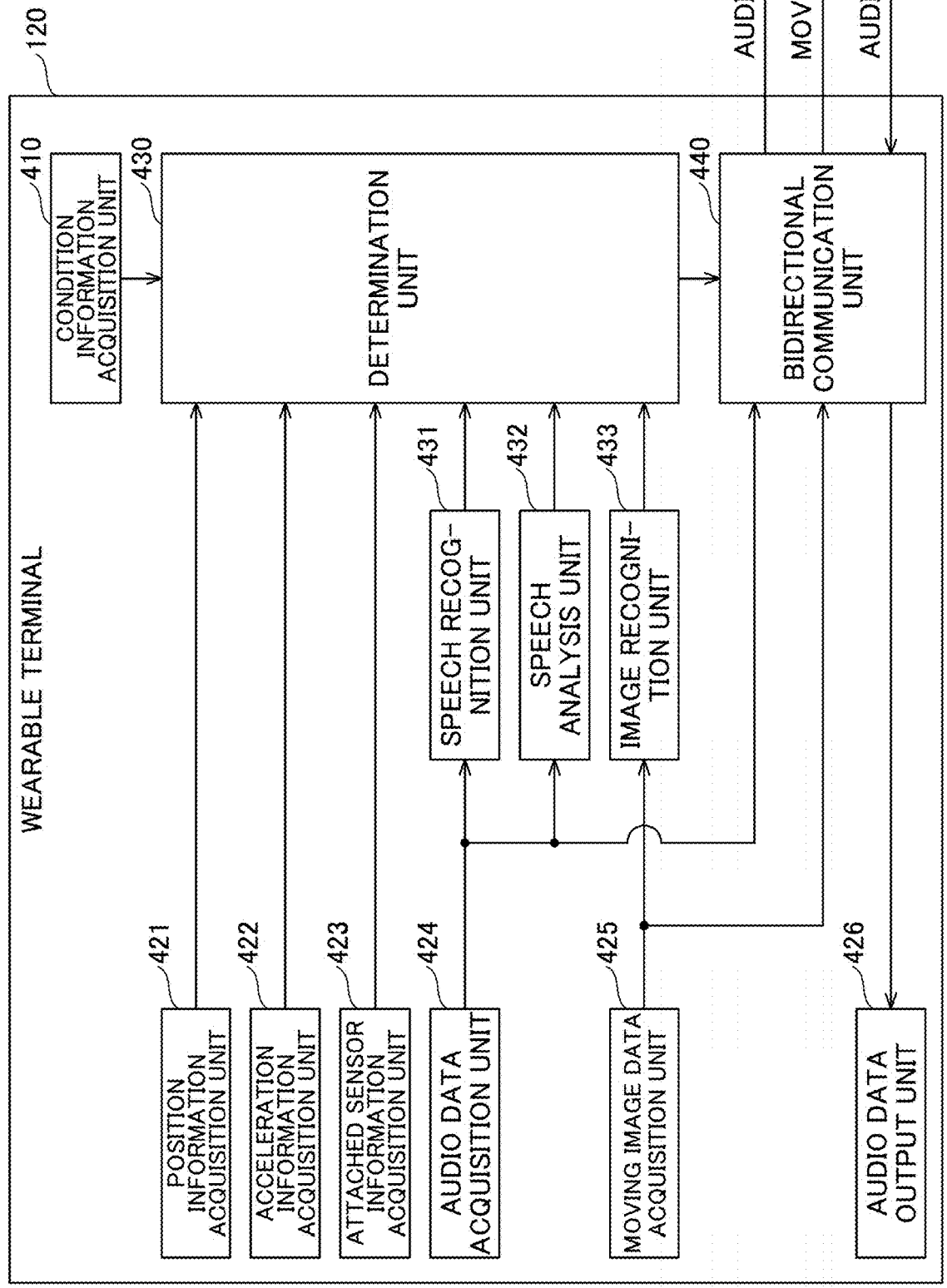

WORK SUPPORT SYSTEM, PORTABLE TERMINAL, WORK SUPPORT METHOD AND WORK SUPPORT PROGRAM

TECHNICAL FIELD

The present disclosure relates to a work support system, a portable terminal, a work support method, and a work support program.

BACKGROUND ART

In various manufacturing sites such as chemical plants, an on-site worker carries a portable terminal such as a wearable terminal, and transmits in real time audio data and moving image data acquired at the manufacturing site to a remote supporter. As a result, the remote supporter can remotely transmit audio instructions when the on-site worker performs various types of work, and the on-site worker can smoothly proceed with the various types of work.

CITATION LIST

Patent Document

[Patent document 1] Japanese Laid-Open Patent Publication No. 2020-177471

SUMMARY OF INVENTION

Technical Problem

However, when a configuration is adopted in which moving image data and audio data are constantly transmitted and received between the on-site worker and the remote supporter, the communication volume increases, the communication cost increases, and the battery capacity of the portable terminal may become insufficient. Meanwhile, it is not necessary for the supporter to constantly monitor the audio data and moving image data transmitted from the portable terminal of the on-site worker. For example, monitoring is not necessary when the on-site worker is moving to another location. Also, the on-site worker is not required to constantly receive audio instructions from the supporter during the work, and there are some work contents that do not require audio instructions from the supporter.

The present disclosure provides a work support system for supporting the work of a worker carrying a portable terminal, in which the communication volume of the portable terminal is reduced.

Solution to Problem

A first aspect of the present disclosure is a work support system including:
a portable terminal; and
a support server configured to communicate with the portable terminal and support a work of a worker carrying the portable terminal, wherein a control unit included in the portable terminal
determines a work behavior of the worker based on condition information specified for each work content performed by the worker, and
changes, in a case of having determined that the work behavior of the worker deviates from a range specified based on the condition information, types of data transmitted from the portable terminal to the support server.

According to the first aspect of the present disclosure, in a work support system for supporting the work of a worker carrying a portable terminal, the communication amount of the portable terminal can be reduced.

A second aspect of the present disclosure is the work support system according to the first aspect, wherein the control unit changes the types of data transmitted from the portable terminal to the support server, from data having a low communication volume per unit time to data having a high communication volume per unit time.

A third aspect of the present disclosure is the work support system according to the first aspect or the second aspect, wherein the control unit determines the work behavior of the worker based on the condition information including either a work time or a start time of the work specified for the each work content.

A fourth aspect of the present disclosure is the work support system according to the third aspect, wherein the control unit
acquires environmental information during the work of the worker, and
determines the work behavior of the worker based on the condition information for the environmental information specified for the each work content.

A fifth aspect of the present disclosure is the work support system according to the fourth aspect, wherein the environmental information is information acquired by the control unit during the work of the worker, and includes any one of position information, image information, audio information, or acceleration information.

A sixth aspect of the present disclosure is the work support system according to the fourth aspect, wherein the condition information is generated based on one or more of the work performance information for the each work content or the environmental information for the each work content acquired during the work.

A seventh aspect of the present disclosure is the work support system according to the sixth aspect, wherein the condition information is generated for the each work content based on an index value of the work performance information specified for the each work content or an index value of the environmental information specified for the each work content.

An eighth aspect of the present disclosure is the work support system according to any one of the first to the seventh aspects, wherein the condition information is generated by training a learning model.

A ninth aspect of the present disclosure is the work support system according to the eighth aspect, wherein
the control unit acquires the environmental information during the work of the worker, and
the condition information is generated by training the learning model using a training data set having the environmental information during the work of the worker as input data and information indicating whether the work behavior is normal during the work of the worker as ground-truth data.

A tenth aspect of the present disclosure is the work support system according to the ninth aspect, wherein the condition information is generated for the each work content by training the learning model using the training data set for the each work content.

An eleventh aspect of the present disclosure is the work support system according to the tenth aspect, wherein, in a case where a determination result determined by the control unit is incorrect, the environmental information during the work of the worker is collected, and the collected environmental information during the work of the worker is used to retrain the learning model for a corresponding work content.

A twelfth aspect of the present disclosure is the work support system according to the eighth aspect, wherein
the control unit acquires the environmental information during the work of the worker, and
the condition information is a rule-based model that uses the environmental information during the work of the worker as input data and outputs information indicating whether the work behavior is normal during the work of the worker.

A thirteenth aspect of the present disclosure is a portable terminal for communicating with a support server for supporting a work of a worker, wherein
a control unit included in the portable terminal determines a work behavior of the worker based on condition information specified for each work content performed by the worker, and
in a case where the control unit determines that the work behavior of the worker deviates from a range specified based on the condition information, the control unit changes types of data transmitted from the portable terminal to the support server.

A fourteenth aspect of the present disclosure is a work support method in a work support system including: a portable terminal; and a support server configured to communicate with the portable terminal and support a work of a worker carrying the portable terminal, the work support method including:
a determination step of determining a work behavior of the worker based on condition information specified for each work content performed by the worker, and
a changing step of changing, in a case of having determined that the work behavior of the worker deviates from a range specified based on the condition information, types of data transmitted from the portable terminal to the support server.

A fifteenth aspect of the present disclosure is for causing a control unit included in a portable terminal that is carried by a worker and communicates with a support server configured to support a work of the worker, to execute:
a determination step of determining a work behavior of the worker based on condition information specified for each work content performed by the worker, and
a changing step of changing, in a case of having determined that the work behavior of the worker deviates from a range specified based on the condition information, types of data transmitted from the portable terminal to the support server.

BRIEF DESCRIPTION OF DRAWINGS

FIG. 2 is a diagram illustrating an example of a hardware configuration of a wearable terminal and a hardware configuration of a management server device or a support server device.
FIG. 3 is a diagram illustrating an example of condition information.
FIG. 4 is a diagram illustrating an example of a functional configuration of the wearable terminal.

DESCRIPTION OF EMBODIMENTS

Figure 1:
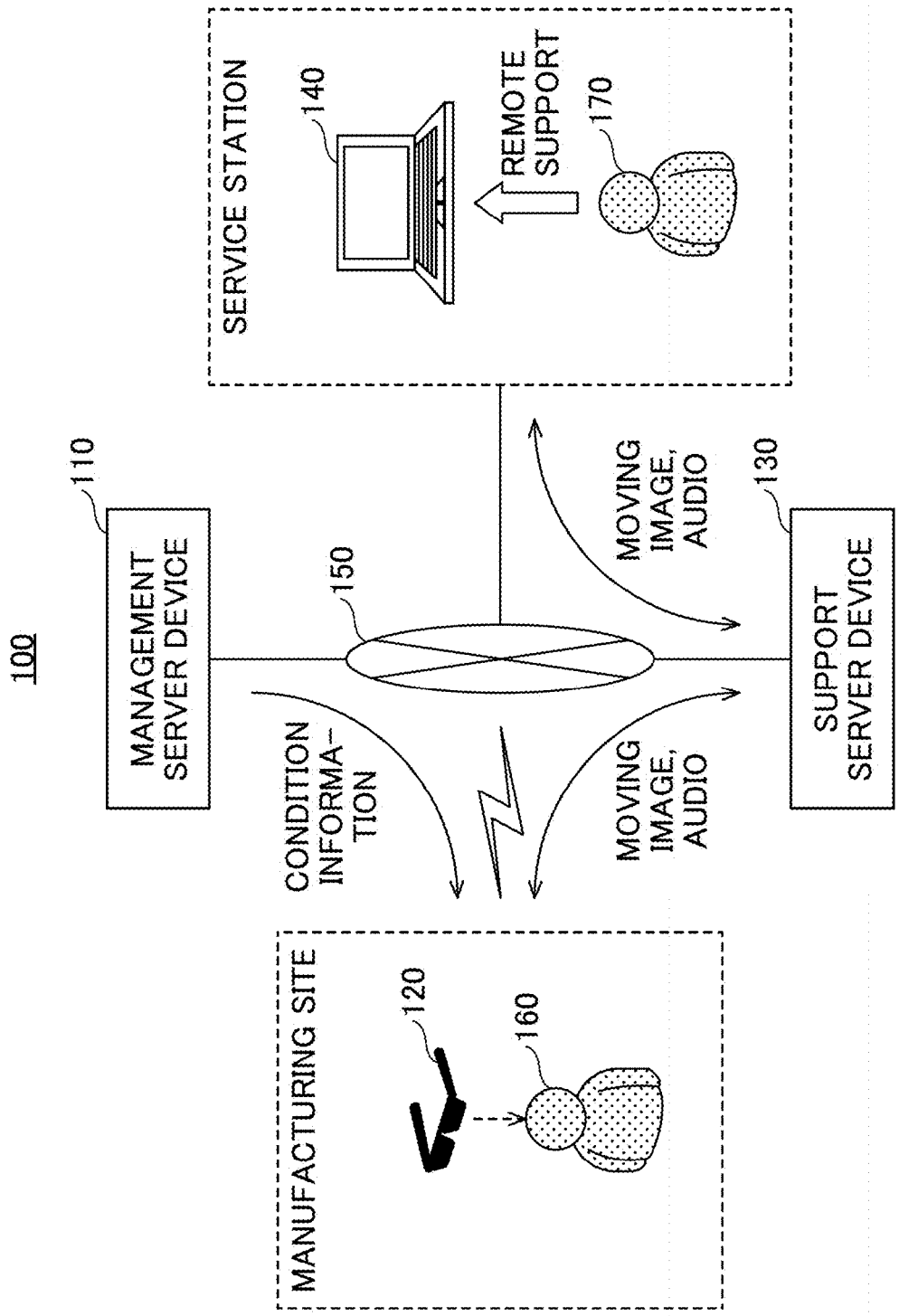
FIG. 1 is a diagram illustrating an example of a system configuration of a work support system.

Each embodiment will be described below with reference to the accompanying drawings. In the present specification and the drawings, components having substantially the same functional configuration are denoted by the same reference numerals, thereby omitting redundant description.

First Embodiment

<System Configuration of Work Support System>
First, a system configuration of a work support system according to a first embodiment will be described. FIG. 1 is a diagram illustrating an example of a system configuration of a work support system. As illustrated in FIG. 1, a work support system 100 includes a management server device 110, a wearable terminal 120, a support server device 130, and a supporter terminal 140.

In the work support system 100, the wearable terminal 120 and the supporter terminal 140 are communicatively connected to the support server device 130 via a network 150. Thus, the wearable terminal 120 and the supporter terminal 140 can perform bidirectional communication under management by the support server device 130.

In the work support system 100, the wearable terminal 120 is communicatively connected to the management server device 110 via a network 150. Thus, the wearable terminal 120 can acquire various information (for example, condition information) managed by the management server device 110 from the management server device 110.

The management server device 110 includes condition information for determining whether work behavior by an on-site worker 160 at a manufacturing site is normal or abnormal, and provides the condition information to the wearable terminal 120.

The case in which the work behavior by the on-site worker 160 at various manufacturing sites (hereinafter, simply referred to as a manufacturing site) such as a chemical plant is normal refers to the following conditions, for example.

The work specified in the work schedule is started at the time specified in the work schedule and finished by the time specified in the work schedule.
The work specified in the work schedule is completed within a predetermined time.
The work is performed by the on-site worker specified in the work schedule.

Conversely, the case in which the work behavior by the on-site worker 160 at the manufacturing site is abnormal refers to a state that deviates from the range specified based on the condition information, and refers to the following conditions, for example.

- The work specified in the work schedule is not started at the time specified in the work schedule.
- The work specified in the work schedule is not finished by the time specified in the work schedule.
- The work specified in the work schedule is not completed within the specified time.
- The work is performed by an on-site worker other than the on-site worker specified in the work schedule.
- The information acquired by the wearable terminal during the work (for example, audio information based on audio data, image information based on moving image data, and the like) includes information not seen under normal conditions.

The work performed by the on-site worker 160 at the manufacturing site includes, for example, product analysis work, inspection work, material input work, and the like in a chemical plant.

The wearable terminal 120 is an example of a portable terminal, and is worn by the on-site worker 160 at the manufacturing site.

As illustrated in FIG. 1, the wearable terminal 120 has, for example, an eyeglass shape, and has functions such as capturing a moving image, detecting voices (for example, utterances of the on-site worker 160) and ambient sounds.

In addition, as illustrated in FIG. 1, the wearable terminal 120 has a function of transmitting, via the network 150, moving image data of the manufacturing site and audio data of the utterances of the on-site worker 160 and the like, to a supporter 170. As a result, the supporter 170 can acquire information necessary for giving audio instructions to the on-site worker 160.

Furthermore, as illustrated in FIG. 1, the wearable terminal 120 has a function of receiving audio instructions from the supporter 170 as audio data via the network 150, and outputting them to the on-site worker 160. As a result, the on-site worker 160 can smoothly proceed with various kinds of work while receiving appropriate audio instructions from the supporter 170.

In the present embodiment, it is assumed that the bidirectional communication between the wearable terminal 120 and the supporter terminal 140 is performed, for example, when it is determined that the work behavior of the on-site worker 160 at the manufacturing site is abnormal. With such a configuration, the work support system according to the present embodiment can reduce the communication volume between the on-site worker 160 and the supporter 170 as compared with a configuration in which bidirectional communication is performed regardless of whether it is normal or not.

The support server device 130 manages bidirectional communication between the wearable terminal 120 and the supporter terminal 140. Specifically, the support server device 130 transmits the moving image data and the audio data received from the wearable terminal 120 to the supporter terminal 140. The support server device 130 transmits the audio data received from the supporter terminal 140 to the wearable terminal 120.

For example, the supporter terminal 140 is installed in a service station, acquires the moving image data captured by the wearable terminal 120 and the audio data detected by the wearable terminal 120 via the network 150, and outputs the acquired data to the supporter 170. The supporter terminal 140 also receives audio instructions from the supporter 170 and transmits them to the on-site worker 160 via the network 150. Thus, the supporter 170 can remotely support the work of the on-site worker 160.

<Hardware Configurations of Wearable Terminal, Management Server Device, Support Server Device, and Supporter Terminal>

Next, the hardware configurations of the wearable terminal 120, the management server device 110, the support server device 130, and the supporter terminal 140 will be described. FIG. 2 is a diagram illustrating an example of the hardware configurations of the wearable terminal, the management server device, and the support server device.

(1) Hardware Configuration of Wearable Terminal 120

First, the hardware configuration of the wearable terminal 120 will be described. FIG. 2 (*a*) is a diagram illustrating an example of the hardware configuration of the wearable terminal 120.

As illustrated in FIG. 2 (*a*), the wearable terminal 120 includes a processor 201, a memory 202, an auxiliary storage 203, a communication device 204, a global positioning system (GPS) device 205, and an acceleration measurement device 206. The wearable terminal 120 also includes an audio input device 207, an audio output device 208, an imaging device 209, a connection device 210, an operation device 211, and a display device 212. Each piece of hardware included in the wearable terminal 120 is connected to each other via a bus 220.

The processor 201 has various computing devices such as a central processing unit (CPU). The processor 201 reads various programs (for example, a work support program and the like, described later) into the memory 202 and executes them.

The memory 202 includes main storage devices such as a read only memory (ROM) and a random access memory (RAM). The processor 201 and the memory 202 form what is known as a computer (also referred to as a "control unit"), and when the processor 201 executes various programs read into the memory 202, the computer implements various functions.

The auxiliary storage 203 stores various programs and various information used when the various programs are executed by the processor 201.

The communication device 204 is a communication device for receiving various kinds of information (for example, condition information) from the management server device 110 and for transmitting and receiving various kinds of data (for example, moving image data and audio data) by performing bidirectional communication with the supporter terminal 140 via the support server device 130.

The GPS device 205 detects position information of the wearable terminal 120. The acceleration measurement device 206 measures acceleration information of the wearable terminal 120 in three axial directions.

The audio input device 207 detects audio data such as voices of the on-site worker 160 wearing the wearable terminal 120 and ambient sounds in the site.

The audio output device 208, for example, outputs audio data received from the support server device 130 to the on-site worker 160 wearing the wearable terminal 120.

The imaging device 209 captures images of the surroundings of the on-site worker 160 wearing the wearable terminal 120 and generates moving image data.

The connection device 210 is a connection device for connecting various attached sensors to the wearable terminal 120.

The operation device 211 receives simple operations performed by the on-site worker 160 to the wearable terminal 120, such as a power ON/OFF switch of the wearable terminal 120.

The display device 212 displays, for example, various information received from the management server device 110 to the on-site worker 160 wearing the wearable terminal 120.

(2) Hardware Configurations of Management Server Device 110 and Support Server Device 130

Next, the hardware configurations of the management server device 110 and the support server device 130 will be described. Because the management server device 110 and the support server device 130 have substantially the same hardware configurations, they will be described together here. FIG. 2 (b) is a diagram illustrating an example of the hardware configuration of the management server device 110 and the support server device 130.

As illustrated in FIG. 2 (b), the management server device 110 and the support server device 130 have a processor 231, a memory 232, an auxiliary storage 233, an operation device 234, a display device 235, a communication device 236, and a drive device 237. Each piece of hardware included in the management server device 110 and the support server device 130 is connected to each other via a bus 238.

The processor 231 has various computing devices such as a CPU and a graphic processing unit (GPU). The processor 231 reads various programs (for example, management programs, support programs, and the like, described later) into the memory 232 and executes them.

The memory 232 includes main storage devices such as a ROM and a RAM. The processor 231 and the memory 232 form what is known as a computer, and when the processor 231 executes various programs read into the memory 232, the computer implements various functions.

The auxiliary storage 233 stores various programs and various data (in the case of the management server device 110, condition information used in the wearable terminal 120) used when the various programs are executed by the processor 231.

The operation device 234 is an operation device for the administrator of the management server device 110 and the support server device 130 to perform various operations. The display device 235 is a display device for displaying the processing results of various processes executed by the management server device 110 and the support server device 130.

The communication device 236 is a communication device for communicating with an external device (for example, the wearable terminal 120 and the supporter terminal 140) via the network 150.

The drive device 237 is a device for setting a recording medium 240. The recording medium 240 includes a medium for recording information optically, electrically, or magnetically, such as a CD-ROM, a flexible disk, a magneto-optical disk, and the like. The recording medium 240 may also include a semiconductor memory or the like for electrically recording information, such as a ROM, a flash memory, or the like.

The various programs installed in the auxiliary storage 233 are installed, for example, when the distributed recording medium 240 is set in the drive device 237 and the various programs recorded in the recording medium 240 are read out by the drive device 237. Alternatively, the various programs installed in the auxiliary storage 233 may be installed by being downloaded from the network 150 via the communication device 236.

(3) Hardware Configuration of Supporter Terminal 140

Because the hardware configuration of the supporter terminal 140 is substantially the same as that of the management server device 110 or the support server device 130, a description thereof will be omitted here. It is assumed that the supporter terminal 140 further includes an audio input device and an audio output device in addition to the hardware configuration of the management server device 110 or the support server device 130. It is also assumed that a bidirectional communication program for bidirectional communication with the wearable terminal 120 via the support server device 130 is installed in the auxiliary storage of the supporter terminal 140.

<Specific Example of Condition Information>

Next, the condition information included in the management server device 110 will be described. FIG. 3 is a diagram illustrating an example of the condition information. Condition information 300 is used when the wearable terminal 120 determines whether the work behavior of the on-site worker 160 at the manufacturing site is normal or abnormal. As illustrated in FIG. 3, the condition information 300 includes schedule information 310 and normal range information 320.

The schedule information 310 is used by the wearable terminal 120 to determine, among other things, the following.

whether the work specified in the work schedule is started at the time specified in the work schedule and finished by the time specified in the work schedule whether the work specified in the work schedule is completed within a predetermined time whether the work is performed by the on-site worker specified in the work schedule As illustrated in FIG. 3, the schedule information 310 specifies a schedule for one day of the day on which the on-site worker 160 (the on-site worker name is "α") performs work. Specifically, the schedule information 310 specifies the work contents (for example, "work A", "work B", "work C"), and the work start time, the work end time, and the work time of each of the work contents, and an allowable range (index value). The schedule information 310 also specifies behaviors other than the work (for example, "movement" (i.e. movement to another location)).

The allowable range specified by the schedule information 310 is specified in advance based on the variations in the work start time, the work end time, and the work time when a plurality of on-site workers wear the wearable terminal to perform each work and it is determined that the work behavior is normal.

The normal range information 320 is used by the wearable terminal 120 to determine the following.

whether the information acquired by the wearable terminal during the work (for example, audio information based on the audio data, image information based on the moving image data, and the like) includes information not seen under normal conditions In FIG. 3, each normal range specified by the normal range information 320 is specified in advance based on the information, among information acquired by the wearable terminals during the work when a plurality of on-site workers wear the wearable terminal to perform each work, which is acquired when it is determined that the work behavior is normal.

For example, "normal range A1" is specified by the variation of the position information detected by the GPS device 205 during the work when a plurality of on-site workers wearing the wearable terminals perform the work with respect to the work content specified as "work A" and the work behavior is determined to be normal.

The variation of the position information indicates, for example, the maximum and minimum values of the x-axis, the maximum and minimum values of the y-axis, and the maximum and minimum values of the z-axis in the absolute coordinate system. However, the variation of the position information is not limited thereto, and may be a value obtained by statistically processing the detected position information.

"Normal range A2" is specified by the variation of the image information based on the moving image data captured by the imaging device 209 when a plurality of on-site workers wearing the wearable terminals perform the work with respect to the work content specified as "work A" and the work behavior is determined to be normal.

The variation in the image information based on the moving image data indicates, for example, the variation in the measured values indicated by the measuring instruments installed at the manufacturing site and the variation in the operating positions indicated by the operating terminals installed at the manufacturing site, which are captured in the moving image data.

"Normal range A3" is specified by the variation of the audio information based on the audio data acquired by the audio input device 207 when a plurality of on-site workers wearing the wearable terminals perform the work with respect to the work content specified as "work A" and the work behavior is determined to be normal.

The variation in the audio information based on the audio data indicates, for example, the variation in the intensity for each frequency calculated by spectral analysis of the audio data, and the "normal range A3" refers to the threshold value of the intensity for detecting an abnormal sound calculated based on the variation.

"Normal range A4" is specified by the variation in the acceleration information measured by the acceleration measurement device 206 when a plurality of on-site workers wearing the wearable terminals perform the work with respect to the work content specified as "work A" and the work behavior is determined to be normal.

The variation in the acceleration information indicates, for example, the maximum and minimum values of the acceleration data in the x-axis direction, the maximum and minimum values of the acceleration data in the y-axis direction, and the maximum and minimum values of the acceleration data in the z-axis direction. However, the variation of the acceleration information is not limited thereto, and may be a value obtained by statistically processing the measured acceleration information.

"Normal range A5" is specified by the variation of the attached sensor information detected by the attached sensor when a plurality of on-site workers wearing the wearable terminals perform the work with respect to the work content specified as "work A" and the work behavior is determined to be normal.

The variation of the attached sensor information indicates, for example, the variation of the concentration of a specific gas when the attached sensor detects the specific gas, and the "normal range A5" refers to the threshold value of the concentration for detecting the generation of the specific gas calculated based on the variation.

<Functional Configuration of Wearable Terminal>

Next, the functional configuration of the wearable terminal 120 will be described. FIG. 4 is a diagram illustrating an example of the functional configuration of the wearable terminal. As described above, a work support program is installed in the wearable terminal 120, and when the program is executed, the wearable terminal 120 functions as the following units.

a condition information acquisition unit 410
a position information acquisition unit 421
an acceleration information acquisition unit 422
an attached sensor information acquisition unit 423
an audio data acquisition unit 424
a moving image data acquisition unit 425
an audio data output unit 426
a speech recognition unit 431
a speech analysis unit 432
an image recognition unit 433
a determination unit 430
a bidirectional communication unit 440

Of these, the condition information acquisition unit 410 acquires condition information from the management server device 110 and notifies the determination unit 430 of the condition information.

The position information acquisition unit 421 acquires position information detected by the GPS device 205 during the work of the on-site worker 160, and notifies the determination unit 430 of the position information.

The acceleration information acquisition unit 422 acquires acceleration information measured by the acceleration measurement device 206 during the work of the on-site worker 160, and notifies the determination unit 430 of the acceleration information.

The attached sensor information acquisition unit 423 acquires attached sensor information detected by the attached sensor during the work of the on-site worker 160, and notifies the determination unit 430 of the attached sensor information.

The audio data acquisition unit 424 acquires audio data detected by the audio input device 207 during the work of the on-site worker 160, and notifies the determination unit 430 via the speech recognition unit 431 or the speech analysis unit 432 of the audio data. When the determination unit 430 determines that the bidirectional communication is performed, the audio data acquisition unit 424 notifies the bidirectional communication unit 440 of the acquired audio data.

The moving image data acquisition unit 425 acquires the moving image data captured by the imaging device 209 during the work of the on-site worker 160 and notifies the determination unit 430 via the image recognition unit 433 of the moving image data. When the determination unit 430 determines that the bidirectional communication is performed, the moving image data acquisition unit 425 notifies the bidirectional communication unit 440 of the acquired moving image data.

When the determination unit 430 determines that the bidirectional communication is performed, the audio data output unit 426 outputs the audio data transmitted from the supporter terminal 140 via the support server device 130.

When the speech recognition unit 431 is provided with the audio data from the audio data acquisition unit 424, the speech recognition unit 431 performs speech recognition processing, extracts information indicating that the work has started and information indicating that the work has finished from the speech of the on-site worker 160, and notifies the determination unit 430 of the information.

When the speech analysis unit 432 is provided with the audio data from the audio data acquisition unit 424, the speech analysis unit 432 notifies the determination unit 430 of the intensity for each frequency calculated by performing spectrum analysis as audio information.

When the image recognition unit 433 is provided with the moving image data from the moving image data acquisition unit 425, the image recognition unit 433 performs image recognition processing, recognizes the measured values of the measuring instruments and the operating positions of the operating terminals captured in each frame of the moving image data, and notifies the determination unit 430 of the result of the recognition as image information.

The determination unit 430 determines the work behavior from the following viewpoints, based on the schedule information 310 included in the condition information 300 notified by the condition information acquisition unit 410, and based on the information indicating that the work has started and the work has finished notified by the speech recognition unit 431.

whether the work specified in the work schedule started at the time specified in the work schedule and finished by the time specified in the work schedule (whether it is within the allowable range)

whether the work specified in the work schedule is completed within a predetermined time (whether it is within the allowable range)

whether the work is performed by the on-site worker specified in the work schedule Hereinafter, information indicating that the work has started and information indicating that the work has finished, which are used for comparison with the schedule information 310, are collectively referred to as "work performance information".

Further, the determination unit 430 compares the normal range information 320 included in the condition information notified by the condition information acquisition unit 410 and the following information to determine the work behavior from the viewpoint of whether information acquired by the wearable terminal during the work includes information not seen under normal conditions.

the position information notified by the position information acquisition unit 421 the acceleration information notified by the acceleration information acquisition unit 422 the attached sensor information notified by the attached sensor information acquisition unit 423 the audio information notified by the speech analysis unit 432 the image information notified by the image recognition unit 433

Hereinafter, the position information, the acceleration information, the attached sensor information, the audio information, and the image information acquired during the work by the on-site worker 160 and used for comparison with the normal range information 320 are collectively referred to as "environmental information".

The determination unit 430 notifies the bidirectional communication unit 440 of the result of the determination (whether the work behavior by the on-site worker 160 is normal or abnormal).

When the determination unit 430 notifies the determination result, and when it is determined that the work behavior by the on-site worker 160 is abnormal, the bidirectional communication unit 440 starts the bidirectional communication. Specifically, the bidirectional communication unit 440 transmits the audio data notified by the audio data acquisition unit 424 and the moving image data notified by the moving image data acquisition unit 425 to the supporter terminal 140 via the support server device 130. The bidirectional communication unit 440 also notifies the audio data output unit 426 of the audio data received from the supporter terminal 140 via the support server device 130.

<Behavior Determination Process by Wearable Terminal>

Figure 5:
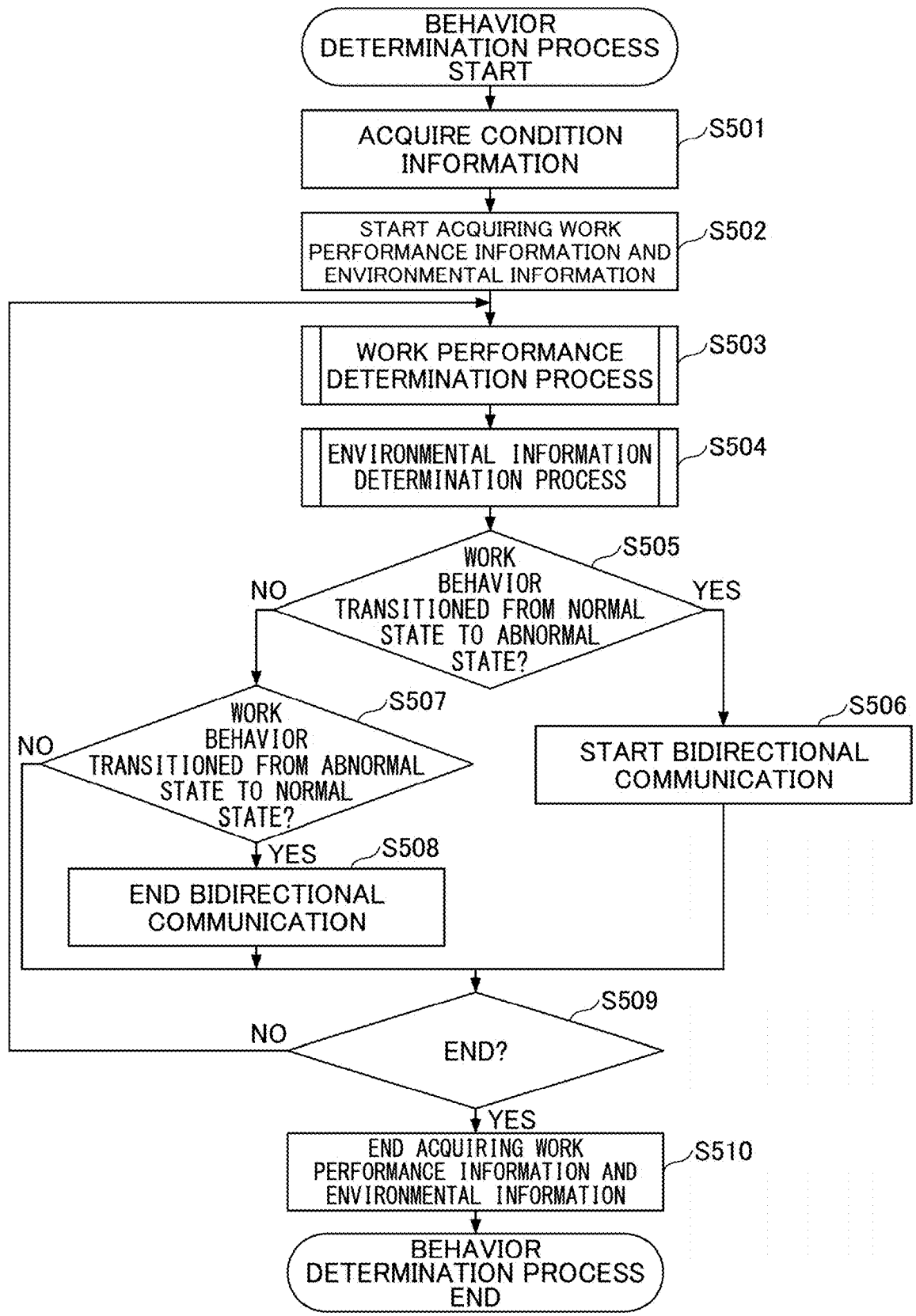
FIG. 5 is a flowchart illustrating a flow of a behavior determination process.

Next, a behavior determination process by the wearable terminal 120 will be described. FIG. 5 is a flowchart illustrating a flow of the behavior determination process.

In step S501, the condition information acquisition unit 410 acquires the condition information from the management server device 110.

In step S502, the determination unit 430 starts acquiring the work performance information and the environmental information.

In step S503, the determination unit 430 compares the schedule information 310 included in the condition information 300 with the work performance information, and performs "work performance determination process" to determine whether the work behavior by the on-site worker 160 is normal. Details of the work performance determination process will be described later.

In step S504, the determination unit 430 compares the normal range information 320 included in the condition information 300 with the environmental information, and performs "environmental information determination process" to determine whether the work behavior by the on-site worker 160 is normal. Details of the environmental information determination process will be described later.

In step S505, the determination unit 430 determines whether the work behavior by the on-site worker 160 has transitioned from a normal state to an abnormal state.

When it is determined in step S506 that the work behavior has not transitioned from the normal state to the abnormal state (NO in step S505), the process proceeds to step S507. The case where the work behavior has not transitioned from the normal state to the abnormal state refers to any of the following cases.

The work behavior remains in the normal state.

The work behavior remains in the abnormal state.

The work behavior has transitioned from the abnormal state to the normal state.

In step S507, the determination unit 430 determines whether the work behavior by the on-site worker 160 has transitioned from the abnormal state to the normal state.

When it is determined in step S507 that the work behavior has not transitioned from the abnormal state to the normal state (NO in step S507), the process proceeds to step S509. The case where the work behavior has not transitioned from the abnormal state to the normal state refers to any of the following cases.

The work behavior remains in the normal state.

The work behavior remains in the abnormal state.

Meanwhile, when it is determined in step S507 that the work behavior has transitioned from the abnormal state to the normal state (YES in step S507), the process proceeds to step S508.

In step S508, the determination unit 430 determines that the bidirectional communication is terminated and notifies the bidirectional communication unit 440. As a result, the bidirectional communication unit 440 terminates the bidirectional communication.

When it is determined in step S505 that the work behavior has transitioned from the normal state to the abnormal state (YES in step S505), the process proceeds to step S506.

In step S506, the determination unit 430 determines that the bidirectional communication is to be started and notifies the bidirectional communication unit 440. As a result, the bidirectional communication unit 440 starts the bidirectional communication.

In step S509, the determination unit 430 determines whether to end the behavior determination process. When it is determined in step S509 that the behavior determination process is not to be ended (NO in step S509), the process returns to step S503.

When it is determined in step S509 that the behavior determination process is to be ended (YES in step S509), the process proceeds to step S510.

In step S510, the determination unit 430 ends the acquisition of the work performance information and the environmental information and ends the behavior determination process.

<Flow of Work Performance Determination Process>

Figure 6:
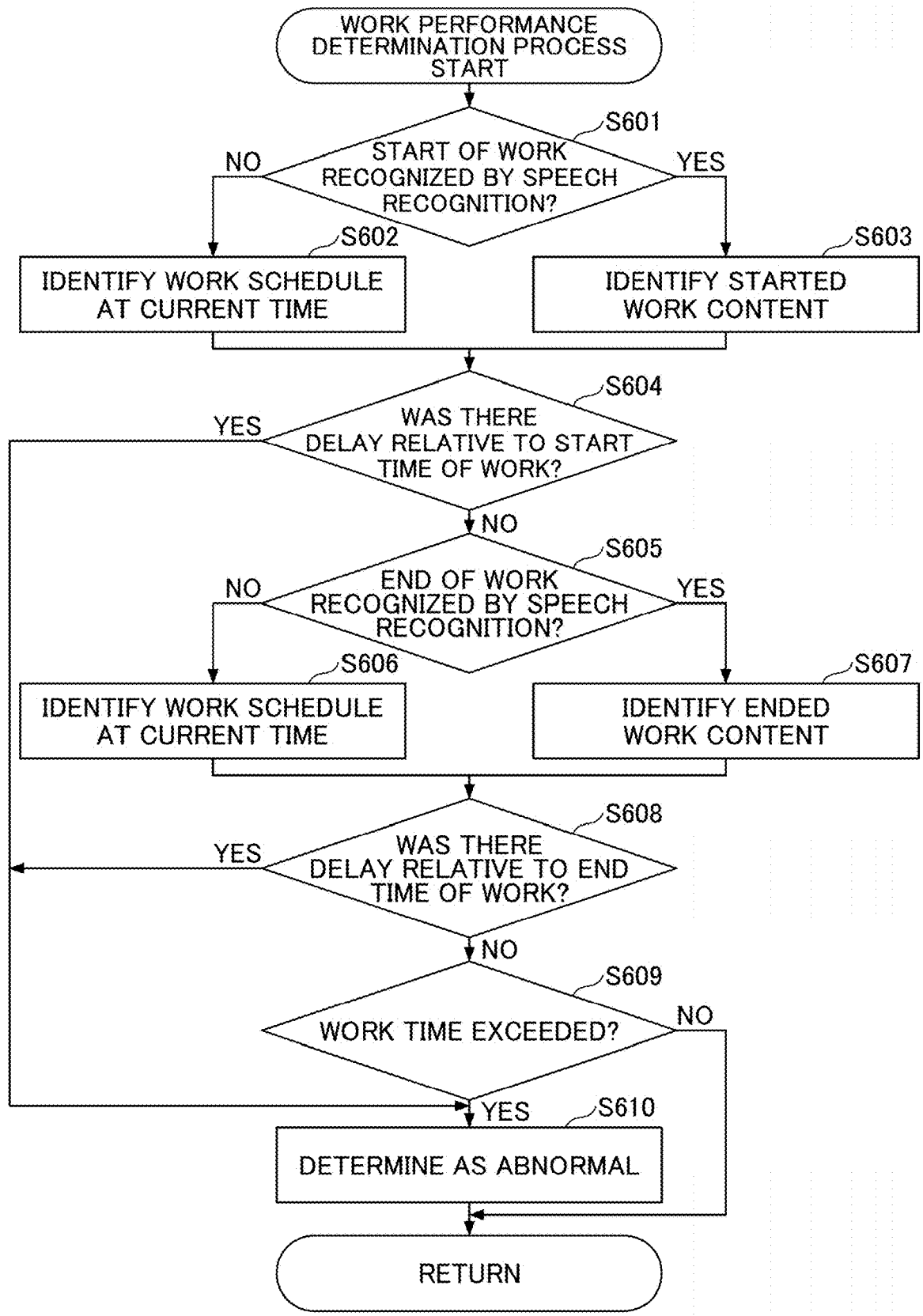
FIG. 6 is a flowchart illustrating a flow of a work performance determination process.

Next, the details of the work performance determination process (step S503) will be described. FIG. 6 is a flowchart illustrating a flow of the work performance determination process.

In step S601, the determination unit 430 determines whether the speech recognition unit 431 has recognized, by the speech recognition, the information indicating the start of the work. When it is determined in step S601 that speech indicating the start of the work is not recognized (NO in step S601), the process proceeds to step S602.

In step S602, the determination unit 430 identifies the work schedule at the current time based on the schedule information 310.

When it is determined in step S601 that the speech indicating the start of the work has been recognized (YES in step S601), the process proceeds to step S603.

In step S603, the determination unit 430 identifies the work content recognized by the speech recognition unit 431.

In step S604, the determination unit 430 determines whether the start time of the work specified in the schedule information 310 is delayed. When it is determined in step S604 that the work is delayed with respect to the start time of the work (YES in step S604), the process proceeds to step S610.

The case where it is determined that the work is delayed with respect to the start time of the work includes the following cases.
- The current time exceeds the allowable range of the start time of the work specified in the schedule information 310, but the speech indicating the start of the work has not yet been recognized.
- The speech indicating the start of the work has been recognized with respect to the work content specified in the schedule information 310, but the time at which the speech has been recognized exceeds the allowable range of the start time specified in the schedule information 310.

When it is determined in step S604 that the work is not delayed with respect to the start time of the work (NO in step S604), the process proceeds to step S605.

In step S605, the determination unit 430 determines whether the speech recognition unit 431 has recognized the speech indicating the end of the work. When it is determined in step S605 that the speech indicating the end of the work is not recognized (NO in step S605), the process proceeds to step S606.

In step S606, the determination unit 430 recognizes the work schedule at the current time based on the schedule information 310.

When it is determined in step S605 that the speech indicating the end of the work is recognized (YES in step S605), the process proceeds to step S607.

In step S607, the determination unit 430 identifies the work content recognized by the speech recognition unit 431.

In step S608, the determination unit 430 determines whether the work is delayed with respect to the end time of the work specified in the schedule information 310. When it is determined in step S608 that the work is delayed with respect to the end time of the work (YES in step S608), the process proceeds to step S610.

The case where it is determined that the work is delayed with respect to the end time of the work includes the following cases.
- The current time exceeds the allowable range of the end time of the work specified in the schedule information 310, but the information indicating the end of the work has not yet been recognized by the speech recognition.
- The speech indicating the end of the work has been recognized with respect to the work content specified in the schedule information 310, but the time at which the speech has been recognized exceeds the allowable range of the end time specified in the schedule information 310.

In step S609, the determination unit 430 determines whether the actual work time exceeded the work time specified in the schedule information 310. When it is determined in step S609 that the actual work time exceeded (YES in step S609), the process proceeds to step S610.

In step S610, the determination unit 430 determines that the work behavior by the on-site worker 160 is abnormal, and the process returns to step S504 in FIG. 5.

When it is determined in step S609 that the actual work time did not exceed (NO in step S609), the process returns directly to step S504 in FIG. 5.

<Flow of Environmental Information Determination Process>

Figure 7:
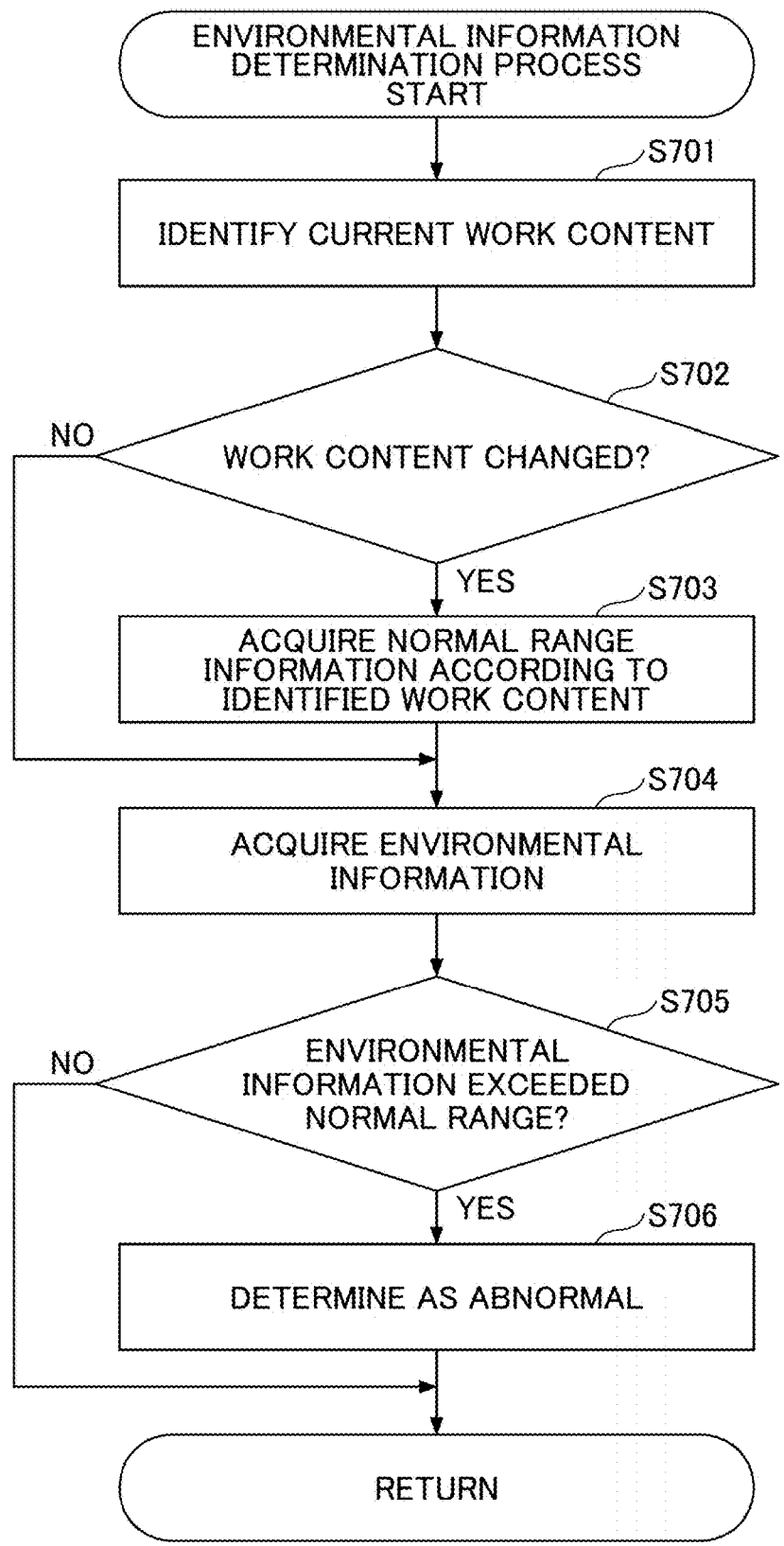
FIG. 7 is a first flowchart illustrating a flow of an environmental information determination process.

Next, the environmental information determination process (step S504) will be described in detail. FIG. 7 is a first flowchart illustrating a flow of the environmental information determination process.

In step S701, the determination unit 430 identifies the current work content based on the schedule information.

In step S702, the determination unit 430 determines whether the work content is changed. When it is determined in step S702 that the work content is not changed (NO in step S702), the process proceeds to step S704.

When it is determined in step S702 that the work content is changed (YES in step S702), the process proceeds to step S703.

In step S703, the determination unit 430 acquires the normal range information corresponding to the work content identified in step S701.

In step S704, the determination unit 430 acquires the environmental information.

In step S705, the determination unit 430 determines whether any of the environmental information acquired in step S704 exceeded the corresponding normal range in the normal range information 320 acquired in step S703.

When it is determined in step S705 that the environmental information did not exceed (NO in step S705), the process returns to step S505 in FIG. 5.

When it is determined in step S705 that the environmental information exceeded the normal range (YES in step S705), the process proceeds to step S706.

In step S706, the determination unit 430 determines that the work behavior by the on-site worker 160 is abnormal, and the process returns to step S505 in FIG. 5.

Summary

As is clear from the above description,
the work support system 100 according to the first embodiment includes: a wearable terminal; and a supporter terminal configured to communicate with the wearable terminal and support a work of an on-site worker wearing the wearable terminal, wherein
the wearable terminal determines a work behavior of the on-site worker based on condition information specified for each work content performed by the on-site worker, and
in a case of having determined that the work behavior of the on-site worker deviates from a range (acceptable range or normal range) specified in the condition information, a bidirectional communication with a supporter terminal is started.

Thus, in the first embodiment, when it is determined that the work behavior of the on-site worker deviates from the range specified in the condition information, the bidirectional communication is started. As a result, according to the first embodiment, the communication volume can be reduced as compared with the case where the bidirectional communication is performed regardless of whether the deviation occurs.

That is, according to the first embodiment, in the work support system for supporting the work of the on-site worker wearing the wearable terminal, the communication volume of the wearable terminal can be reduced.

Second Embodiment

In the first embodiment described above, when it is determined that any of the environmental information exceeds the corresponding normal range in the normal range information 320, it is determined that the work behavior by the on-site worker is abnormal. However, the method for determining whether the work behavior by the on-site worker is normal or abnormal is not limited thereto.

It may be configured that, when it is determined that any of the plurality of combinations of the environmental information exceeds the combination of the corresponding normal ranges in the normal range information 320, it is determined that the work behavior by the on-site worker is abnormal. The combination pattern may be specified in advance as a predetermined determination rule (a rule-based model), and it may be configured that the determination unit 430 determine, for all the combination patterns, whether the combinations of the environmental information fall under the predetermined determination rule each time the environmental information is acquired. The determination rule may be specified for each work content. Hereinafter, the second embodiment will be described focusing on differences from the first embodiment.

<Flow of Environmental Information Determination Process>

Figure 8:
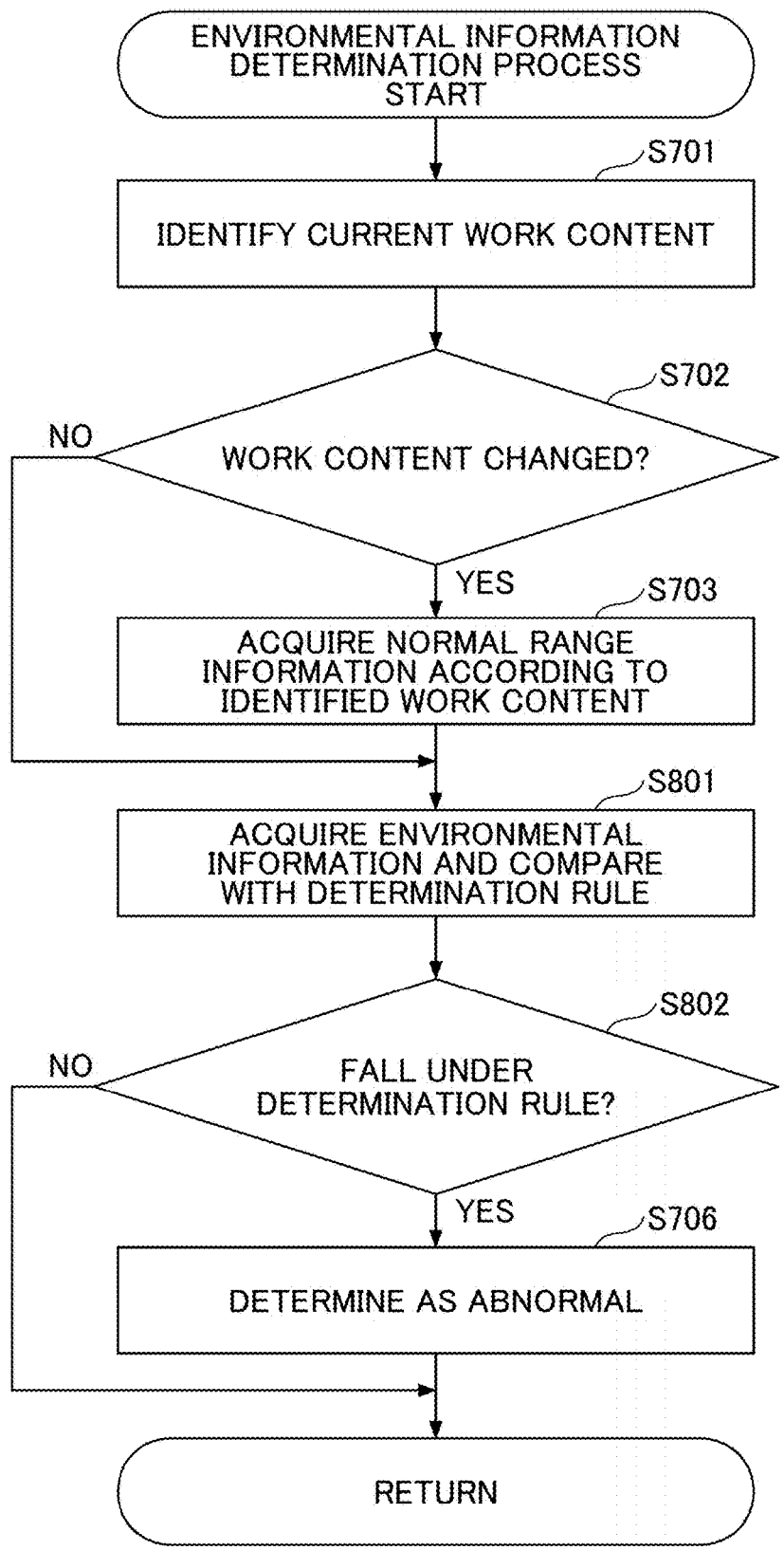
FIG. 8 is a second flowchart illustrating a flow of the environmental information determination process.

FIG. 8 is a second flowchart illustrating a flow of the environmental information determination process. The differences from the environmental information determination process illustrated in FIG. 7 are steps S801 and S802.

In step S801, the determination unit 430 acquires the environmental information and compares it with the combination pattern included in the determination rule.

In step S802, the determination unit 430 determines whether the acquired environmental information corresponds to any combination pattern among the combination patterns included in the determination rule.

When it is determined in step S802 that the environmental information corresponds to any combination pattern (YES in step S802), the process proceeds to step S706. When it is determined in step S802 that the environmental information does not correspond to any combination pattern (NO in step S802), the process returns to step S505 in FIG. 5.

Summary

As is clear from the above description, in the work support system 100 according to the second embodiment,
the wearable terminal acquires environmental information during the work of the on-site worker, and
the wearable terminal determines whether the work behavior by the on-site worker is normal using a rule-based model that uses the environmental information during the work of the worker as input data and determines whether the work behavior by the on-site worker is normal.

Thus, according to the second embodiment, the same effect as that of the first embodiment can be obtained.

Third Embodiment

In the second embodiment, it is determined whether the work behavior by the on-site worker is normal based on the environmental information using a rule-based model. Meanwhile, according to the third embodiment, it is determined whether the work by the on-site worker is normal based on the environmental information using a learning model for machine learning the relationship between the environmental information and whether the work behavior by the on-site worker is normal. Hereinafter, the third embodiment will be described focusing on differences from the first and second embodiments.

<Functional Configuration of Wearable Terminal and Management Server in Learning Phase>

Figure 9:
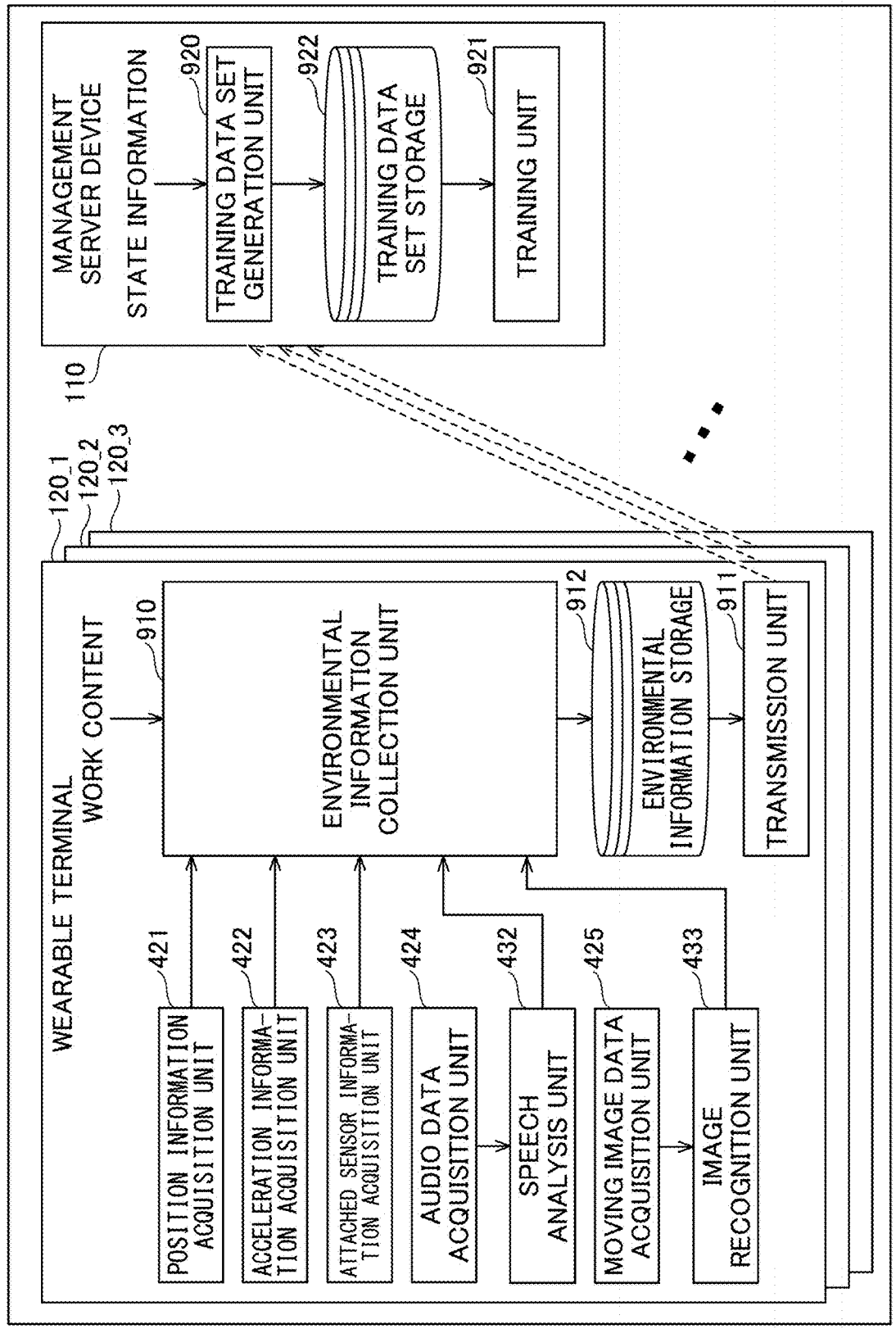
FIG. 9 is a diagram illustrating an example of a functional configuration of the wearable terminal and the management server device in a learning phase.

First, the functional configuration of the wearable terminal and the management server in the learning phase will be described. FIG. 9 is a diagram illustrating an example of the functional configuration of the wearable terminal and the management server in the learning phase.

As illustrated in FIG. 9, in the learning phase, a plurality of wearable terminals are used to collect the environmental information. Although the example in FIG. 9 illustrates three wearable terminals 120_1 to 120_3 for convenience, three or more wearable terminals may be used to collect the environmental information.

As illustrated in FIG. 9, each of the plurality of wearable terminals 120_1 to 120_3 and the like includes the following units.

the position information acquisition unit 421
the acceleration information acquisition unit 422
the attached sensor information acquisition unit 423
the audio data acquisition unit 424
the speech analysis unit 432
the moving image data acquisition unit 425
the image recognition unit 433
an environmental information collection unit 910
a transmission unit 911

Because the functions of the position information acquisition unit 421 to the image recognition unit 433 have already been described with reference to FIG. 4, the description thereof is omitted here.

The environmental information collection unit 910 acquires the position information, the acceleration information, the attached sensor information, the audio information, and the image information as the environmental information from the position information acquisition unit 421 to the image recognition unit 433. Further, when the environmental information is acquired, the environmental information collection unit 910 determines the work content performed by the on-site worker, and stores the environmental information in the environmental information storage 912 separately for each work content.

The transmission unit 911 transmits the environmental information for each work content stored in the environmental information storage 912 to the management server device 110.

As illustrated in FIG. 9, in the learning phase, the management server device 110 functions as a training data set generation unit 920 and a training unit 921.

The training data set generation unit 920 stores the environmental information for each work content sent from the plurality of wearable terminals 120_1 to 120_3 and the like as a training data set in the training data set storage 922 in association with state information. The state information is information indicating whether the work behavior performed by each on-site worker was normal or not when the environmental information was acquired.

The training unit 921 reads the training data set stored in the training data set storage 922 and uses the read training data set to perform a training process for each work content. The trained model generated by performing the training process for each work content by the training unit 921 is executed on the wearable terminal.

<Functional Configuration of Training Unit>

Figure 10:
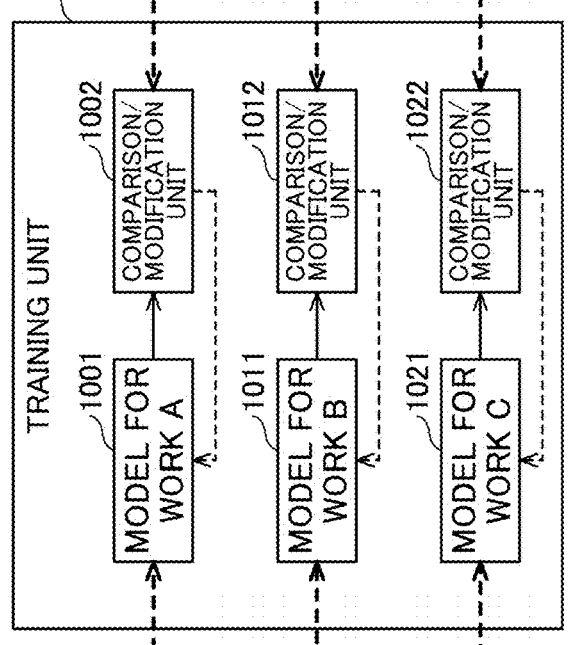
FIG. 10 is a diagram illustrating an example of a functional configuration of a training unit.

Next, the functional configuration of the training unit 921 will be described. FIG. 10 is a diagram illustrating an example of the functional configuration of the training unit. As illustrated in FIG. 10, the training unit 921 includes a model and a comparison/modification unit for each work content. For convenience of description, the example of FIG. 10 illustrates a case where the work content includes "work A", "work B", and "work C", and the training process is performed on a model corresponding to the three works. However, the work content is not limited to three types, and for example, the training process may be performed on each model corresponding to three or more types of works.

The environmental information corresponding to the work content specified as "work A" in the training data sets 1010_1 to 1010_3 and the like is input as input data to a model 1001 for work A. The model 1001 for work A operates when input data is input, and outputs output data.

To the comparison/modification unit 1002, the ground-truth data corresponding to the work content specified as "work A" in the training data sets 1010_1 to 1010_3 and the like is input. The comparison/modification unit 1002 compares the ground-truth data with the output data output from the model 1001 for work A. The comparison/modification unit 1002 updates the model parameters of the model 1001 for work A based on the result of the comparison, and thereby performs a training process on the model 1001 for work A. As a result, a trained model for work A is generated. The trained model for work A corresponds to the normal range (index value) associated with the work content specified as "work A" in the normal range information 320 of the condition information 300 in the first embodiment.

Similarly, the environmental information corresponding to the work content specified as "work B" in the training data sets 1010_1 to 1010_3 and the like is input as input data to a model 1011 for work B. The model 1011 for work B operates when input data is input, and outputs output data.

To the comparison/modification unit 1012, the ground-truth data corresponding to the work content specified as "work B" in the training data sets 1010_1 to 1010_3 and the like is input. The comparison/modification unit 1012 compares the ground-truth data with the output data output from the model 1011 for work B. The comparison/modification unit 1012 updates the model parameters of the model 1011 for work B based on the result of the comparison, and thereby performs a training process on the model 1011 for work B. As a result, a trained model for work B is generated. The trained model for work B corresponds to the normal range (index value) associated with the work content specified as "work B" in the normal range information 320 of the condition information 300 in the first embodiment.

Similarly, the environmental information corresponding to the work content specified as "work C" in the training data sets 1010_1 to 1010_3 or the like is input as input data to a model 1021 for work C. The model 1021 for work C operates when input data is input, and outputs output data.

To the comparison/modification unit 1022, the ground-truth data corresponding to the work content specified as "work C" in the training data sets 1010_1 to 1010_3 and the like is input. The comparison/modification unit 1022 compares the ground-truth data with the output data output from the model 1021 for work C. The comparison/modification unit 1022 updates the model parameters of the model 1021 for work C based on the result of the comparison, and thereby performs a training process on the model 1021 for work C. As a result, a trained model for work C is generated. The trained model for work C corresponds to the normal range (index value) associated with work content specified as "work C" in the normal range information 320 of the condition information 300 in the first embodiment.

<Functional Configuration of Wearable Terminal in Determination Phase>

Figure 11:
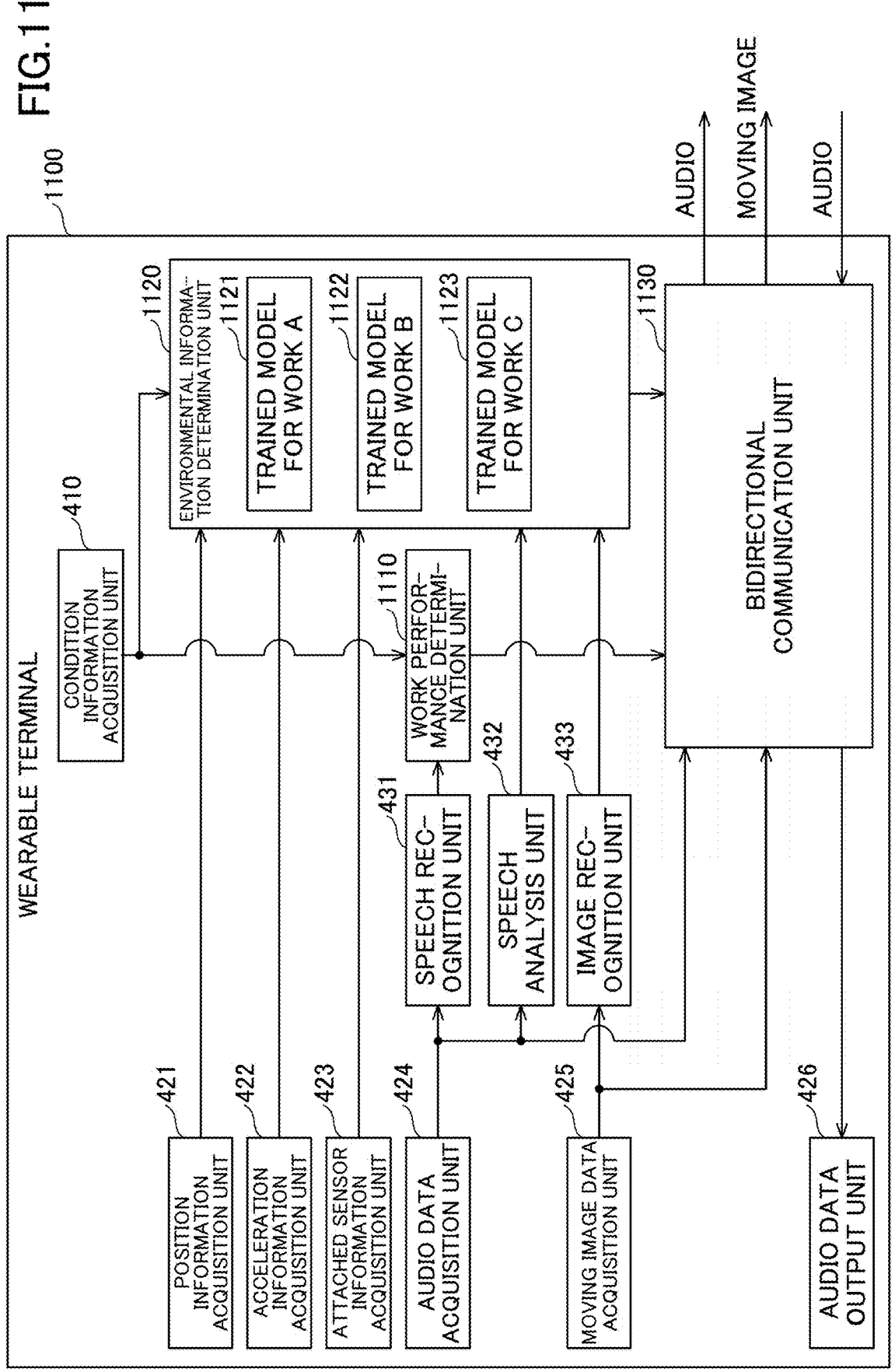
FIG. 11 is a diagram illustrating an example of a functional configuration of the wearable terminal in a determination phase.

Next, the functional configuration of the wearable terminal in the determination phase will be described. FIG. 11 is a diagram illustrating an example of the functional configuration of the wearable terminal in the determination phase.

As illustrated in FIG. 11, the wearable terminal 1100 in the determination phase includes the following units.

the condition information acquisition unit 410
    the position information acquisition unit 421
    the acceleration information acquisition unit 422
    the attached sensor information acquisition unit 423
    the audio data acquisition unit 424
    the moving image data acquisition unit 425
    the audio data output unit 426
    the speech recognition unit 431
    the speech analysis unit 432
    the image recognition unit 433
    a work performance determination unit 1110
    an environmental information determination unit 1120
    a bidirectional communication unit 1130

Because the functions of the condition information acquisition unit 410 to the image recognition unit 433 have already been described with reference to FIG. 4, the description thereof is omitted here.

The work performance determination unit 1110 determines, among other things, the following, based on the schedule information 310 included in the condition information 300 notified by the condition information acquisition unit 410 and based on the work performance information notified by the speech recognition unit 431.

whether the work specified in the work schedule is started at the time specified in the work schedule and finished by the time specified in the work schedule whether the work specified in the work schedule is completed within a predetermined time whether the work is performed by the on-site worker specified in the work schedule The work performance determination unit 1110 notifies the bidirectional communication unit 1130 of the determination result.

The environmental information determination unit 1120 includes a trained model 1121 for work A, a trained model 1122 for work B, and a trained model 1123 for work C.

The trained model 1121 for work A operates when it determines that the current work content is "work A" based on the schedule information 310 notified by the condition information acquisition unit 410. When the environmental information is input, the trained model 1121 for work A infers whether the work behavior by the on-site worker 160 is normal or abnormal, and notifies the bidirectional communication unit 1130 of the inference result.

Similarly, the trained model 1122 for work B operates when it determines that the current work content is "work B" based on the schedule information 310 notified by the condition information acquisition unit 410. When the environmental information is input, the trained model 1122 for work B infers whether the work behavior by the on-site worker 160 is normal or abnormal, and notifies the bidirectional communication unit 1130 of the inference result.

Similarly, the trained model 1123 for work C operates when it determines that the current work content is "work C" based on the schedule information 310 notified by the condition information acquisition unit 410. When the environmental information is input, the trained model 1123 for work C infers whether the work behavior by the on-site worker 160 is normal or abnormal, and notifies the bidirectional communication unit 1130 of the inference result.

Thus, in the present embodiment, the trained model 1121 for work A to the trained model 1123 for work C correspond to the normal range information 320 of the condition information 300 in the first and second embodiments.

The bidirectional communication unit 1130 starts bidirectional communication when the determination result is notified by the work performance determination unit 1110 and when it is determined that the work behavior by the on-site worker 160 is abnormal. Alternatively, the bidirectional communication unit 1130 starts bidirectional communication when the inference result is notified by the environmental information determination unit 1120 and when it is inferred that the work behavior by the on-site worker 160 is abnormal.

Specifically, the bidirectional communication unit 1130 transmits the audio data notified by the audio data acquisition unit 424 and the moving image data notified by the moving image data acquisition unit 425 to the supporter terminal 140 via the support server device 130. The bidirectional communication unit 440 also notifies the audio data output unit 426 of the audio data received from the supporter terminal 140 via the support server device 130.

<Flow of Environmental Information Determination Process>

Figure 12:
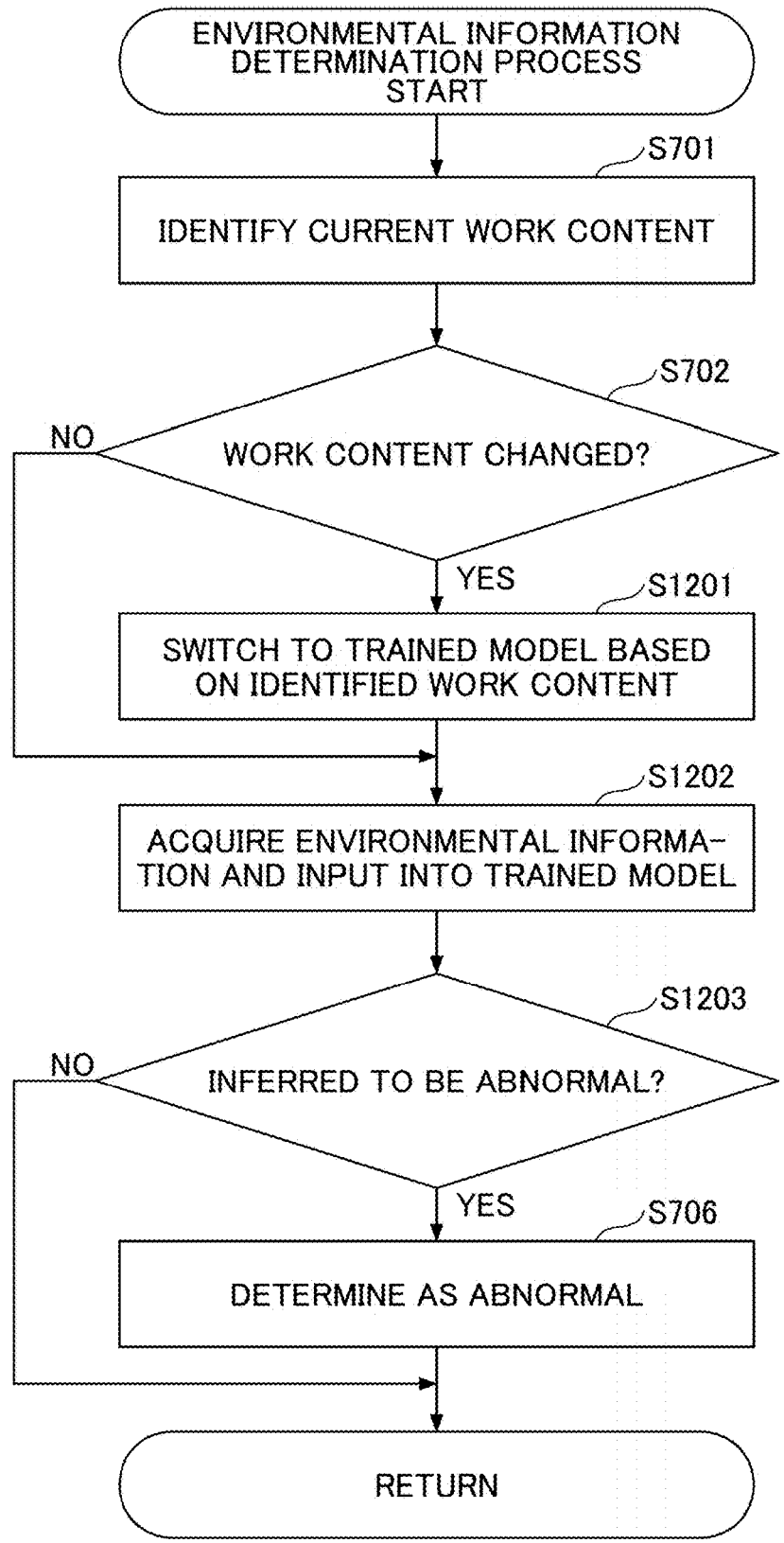
FIG. 12 is a third flowchart illustrating a flow of the environmental information determination process.

Next, the environmental information determination process performed by the wearable terminal 1100 will be described in detail. FIG. 12 is a third flowchart illustrating a flow of the environmental information determination process. The differences from the environmental information determination process illustrated in FIG. 7 are steps S1201 to S1203.

In step S1201, the environmental information determination unit 1120 switches to the trained model corresponding to the work content.

In step S1202, the environmental information determination unit 1120 acquires the environmental information and inputs the acquired environmental information to the switched trained model. As a result, the trained model outputs an inference result.

In step S1203, the environmental information determination unit 1120 determines whether the result of the inference is that the work behavior by the on-site worker 160 is normal or abnormal. When it is determined in step S1203 that the result of the inference is normal (NO in step S1203), the process returns to step S505 in FIG. 5.

When it is determined in step S1203 that the result of the inference is abnormal (YES in step S1203), the process proceeds to step S706.

<Summary>

As is clear from the above description, in the work support system 100 according to the third embodiment, the environmental information determination unit is generated by performing a training process on a learning model, and the training process on the learning model is performed using a training data set having the environmental information during the work of the on-site worker as input data and information indicating whether the work behavior is normal during the work of the worker as ground-truth data.

Thus, according to the third embodiment, the same effect as that of the first embodiment can be obtained.

Other Embodiments

In each of the above embodiments, the bidirectional communication with the supporter terminal 140 is not performed while the work behavior by the on-site worker 160 is determined to be normal, and the bidirectional communication with the supporter terminal 140 is started when the work behavior by the on-site worker 160 is determined to be abnormal. However, the method for reducing the communication volume is not limited thereto. It may be configured so that the communication volume during the work behavior by the on-site worker 160 is determined to be normal and the communication volume after the work behavior by the on-site worker 160 is determined to be abnormal are different.

Examples of a method for making the communication volumes different includes a method of changing types of data to be bidirectionally communicated with the supporter terminal 140. The method of changing types of data includes changing data having a low communication volume per unit time to data having a high communication volume per unit time. The method includes the following, for example.

a method of transmitting audio data while it is determined to be normal, and transmitting audio data and moving image data when it is determined to be abnormal a method of changing the quality (compression ratio, transmission interval, and the like) of the data between the audio data and the moving image data to be transmitted while it is determined to be normal and the audio data and the moving image data to be transmitted when it is determined to be abnormal In each of the above embodiments, the position information, the acceleration information, the attached sensor information, the audio information, and the image information are exemplified as the environmental information. However, the environmental information is not limited thereto, and may be other information as long as it is information that the wearable terminal 120 can acquire during the work of the on-site worker 160.

In each of the above embodiments, the position information detected by the GPS device 205 is acquired, but the acquisition method of the position information is not limited thereto, and other acquisition methods may be used to acquire the position information. Other acquisition methods include, for example, a method of acquiring position information from moving image data captured by the imaging device using Visual Simultaneous Localization and Mapping (SLAM) technology or the like.

Although the functional configuration of the wearable terminal when generating the normal range information 320 has not been mentioned in the above first embodiment, the functional configuration described with reference to FIG. 9 in the above third embodiment may be used for generating the normal range information 320, for example.

In the above third embodiment, the case where the training unit 921 generates a trained model by performing a training process using a training data set was described. However, when the inference result of the generated trained model is incorrect, the training process may be performed again on the trained model of the corresponding work content. In the retraining process, the training unit 921 uses, for example, the environmental information during the work of the on-site worker when the inference result is incorrect.

Further, in each of the above embodiments, the case where a wearable terminal worn by the on-site worker is used has been described, but instead of the wearable terminal, a portable terminal carried by the on-site worker may be used.

Although the embodiments have been described above, it will be understood that various changes in form and details are possible without departing from the spirit and scope of the claims.

The present international application is based upon and claims priority to Japanese patent application No. 2022-061127 filed on Mar. 31, 2022, the entire contents of which are incorporated herein by reference.

REFERENCE SIGNS LIST

- 100: Work support system
- 110: Management server device
- 120: Wearable terminal
- 130: Support server device
- 140: Supporter terminal
- 300: Condition information
- 310: Schedule information
- 320: Normal range information
- 410: Condition information acquisition unit
- 421: Position information acquisition unit
- 422: Acceleration information acquisition unit
- 423: Attached sensor information acquisition unit
- 424: Audio data acquisition unit
- 425: Moving image data acquisition unit
- 426: Audio data output unit
- 430: Determination unit
- 431: Speech recognition unit
- 432: Speech analysis unit
- 433: Image recognition unit
- 440: Bidirectional communication unit
- 910: Environmental information collection unit
- 911: Transmission unit
- 920: Training data set generation unit
- 921: Training unit
- 1110: Work performance determination unit
- 1120: Environmental information determination unit
- 1121: Trained model for work A
- 1122: Trained model for work B
- 1123: Trained model for work C
- 1130: Bidirectional communication unit

The invention claimed is:

1. A work support system comprising:
  a portable terminal; and
  a support server configured to communicate with the portable terminal and support a work of a worker carrying the portable terminal, wherein a control unit included in the portable terminal
  determines a work behavior of the worker based on condition information specified for each work content performed by the worker, and
  changes, in a case of having determined that the work behavior of the worker deviates from a range specified based on the condition information, types of data transmitted from the portable terminal to the support server from data having a low communication volume per unit time to data that (i) has a high communication volume per unit time and (ii) includes audio data and moving image data.

2. The work support system according to claim 1, wherein the control unit determines the work behavior of the worker based on the condition information including either a work time or a start time of the work specified for the each work content.

3. The work support system according to claim 2, wherein the control unit acquires environmental information during the work of the worker, and
  determines the work behavior of the worker based on the condition information for the environmental information specified for the each work content.

4. The work support system according to claim 3, wherein the environmental information is information acquired by the control unit during the work of the worker, and includes any one of position information, image information, audio information, or acceleration information.

5. The work support system according to claim 3, wherein the condition information is generated based on one or more of the work performance information for the each work content or the environmental information for the each work content acquired during the work.

6. The work support system according to claim 5, wherein the condition information is generated for the each work content based on an index value of the work performance information specified for the each work content or an index value of the environmental information specified for the each work content.

7. The work support system according to claim 1, wherein the condition information is generated by training a learning model.

8. The work support system according to claim 7, wherein the control unit acquires the environmental information during the work of the worker, and
  the condition information is generated by training the learning model using a training data set having the environmental information during the work of the worker as input data and information indicating whether the work behavior is normal during the work of the worker as ground-truth data.

9. The work support system according to claim 8, wherein the condition information is generated for the each work content by training the learning model using the training data set for the each work content.

10. The work support system according to claim 9, wherein, in a case where a determination result determined by the control unit is incorrect, the environmental information during the work of the worker is collected, and the collected environmental information during the work of the worker is used to retrain the learning model for a corresponding work content.

11. The work support system according to claim 7, wherein
the control unit acquires the environmental information during the work of the worker, and
the condition information is a rule-based model that uses the environmental information during the work of the worker as input data and outputs information indicating whether the work behavior is normal during the work of the worker.

12. A portable terminal for communicating with a support server for supporting a work of a worker, wherein
a control unit included in the portable terminal determines a work behavior of the worker based on condition information specified for each work content performed by the worker, and
in a case where the control unit determines that the work behavior of the worker deviates from a range specified based on the condition information, the control unit changes types of data transmitted from the portable terminal to the support server from data having a low communication volume per unit time to data that (i) has a high communication volume per unit time and (ii) includes audio data and moving image data.

13. A work support method in a work support system including: a portable terminal; and a support server configured to communicate with the portable terminal and support a work of a worker carrying the portable terminal, the work support method comprising:
a determination step of determining a work behavior of the worker based on condition information specified for each work content performed by the worker, and
a changing step of changing, in a case of having determined that the work behavior of the worker deviates from a range specified based on the condition information, types of data transmitted from the portable terminal to the support server from data having a low communication volume per unit time to data that (i) has a high communication volume per unit time and (ii) includes audio data and moving image data.

14. A non-transitory computer-readable recording medium storing a work support program for causing a control unit included in a portable terminal that is carried by a worker and communicates with a support server configured to support a work of the worker, to execute:
a determination step of determining a work behavior of the worker based on condition information specified for each work content performed by the worker, and
a changing step of changing, in a case of having determined that the work behavior of the worker deviates from a range specified based on the condition information, types of data transmitted from the portable terminal to the support server from data having a low communication volume per unit time to data that (i) has a high communication volume per unit time and (ii) includes audio data and moving image data.

* * * * *